United States Patent [19]

Weber

[11] Patent Number: 5,215,564
[45] Date of Patent: Jun. 1, 1993

[54] PROCESS FOR THE PRODUCTION OF AN OPTICAL WAVEGUIDE PREFORM

[75] Inventor: Dieter Weber, Kornwestheim, Fed. Rep. of Germany

[73] Assignee: Alcatel N.V., Netherlands

[21] Appl. No.: 810,201

[22] Filed: Dec. 19, 1991

[30] Foreign Application Priority Data

Dec. 21, 1990 [DE] Fed. Rep. of Germany ........ 4041152
Dec. 21, 1990 [DE] Fed. Rep. of Germany ........ 4041153

[51] Int. Cl.$^5$ ............................................. C03B 37/075
[52] U.S. Cl. ...................................... 65/3.11; 65/32.1; 65/13; 65/33
[58] Field of Search ..................... 65/3.11, 3.12, 32.1, 65/13, 33

[56] References Cited

U.S. PATENT DOCUMENTS

| | | | |
|---|---|---|---|
| 4,501,601 | 2/1985 | Haupt | 65/2 |
| 4,772,302 | 9/1988 | Abe | 65/3.12 |
| 4,775,401 | 10/1988 | Fleming et al. | 65/3.11 |
| 4,867,774 | 9/1989 | Dorn | 65/3.11 X |
| 5,090,980 | 2/1992 | Clasen | 65/3.12 |

*Primary Examiner*—Robert L. Lindsay
*Attorney, Agent, or Firm*—Ware, Fressola, Van Der Sluys & Adolphson

[57] ABSTRACT

In the process for the production of an optical waveguide preform, in which the cladding layer is applied as a tubular powder layer onto a cylindrical glass core rod and is densified by heating, the powder layer has a relative density of approximately 6 percent, which is increased to 25–50 percent during the stabilization process. In order for this process to proceed without damage to the preform, the powder layer is initially heated at a low heating rate. From approximately 150° C., the heating rate is increased until a higher temperature is reached.

8 Claims, No Drawings

PROCESS FOR THE PRODUCTION OF AN OPTICAL WAVEGUIDE PREFORM

BACKGROUND OF THE INVENTION

1. Field of the Invention

The application relates to a process for the production of an optical waveguide preform, in which the cladding layer is applied as a tubular powder layer onto a cylindrical glass core rod and is stabilized by heating in an isothermal temperature field. The sintering of the powder layer to form the cladding finally takes place at temperatures of over 1250° C.

2. Description of the Prior Art

A process of this type is known under the name of MSP Process (MSP=Mechanical Shaping of Preforms) (Article: "Technologies for the Production of Preforms for Optical Fibers", in Elektrisches Nachrichtenwesen Heft 3/4, 1988). Since it is possible, with the presently known processes, to produce optical waveguides from glass in a quality that has almost reached the theoretically possible limit at the attenuation values achieved, intensive work is now being carried out on a reduction of the production costs. This also includes the efforts directed at an increase in the size of preforms, from which optical waveguides of great length can be prepared from one piece. From a preform with an end diameter of fifty-five millimeters (55 mm) and a length of fifty centimeters (50 cm), an optical waveguide with a length of one hundred kilometers (100 km) can be drawn.

If, in the production of preforms by the MSP process, the cladding layer, made of oxide powder with an initial bulk density of between five (5) and fifteen (15) percent, is stabilized by heat treatment to at least twenty five percent (25%) of its final density, where 100 percent density is equal to the density of the final sintered glass material, it has been found that the body is produced with bends and tears. This destruction of the semi-finished preform may be attributed to the interaction of the core and the formed cladding layer acting in opposite directions.

Desirably the stabilized cladding layer must be free of cracks so that the glassy cladding layer sintered from it is also free of cracks whereby the optical waveguides drawn from the finished optical waveguide preform do not show any increase in attenuation.

Since the powdery or strongly porous cladding layer shows a very large radial and axial shrinkage during stabilization, it is desirable to ensure that the tubular cladding layer can slide on the core rod. If this is not achieved, the cladding layer will adhere to the core rod and the optical waveguide preform formed will tear, break or rupture.

The cladding layer, which is still porous during stabilization, contains several substances that would interfere with light guidance in the finished optical waveguide if they were not removed during the stabilization process or thereafter.

SUMMARY OF THE INVENTION

The previously-mentioned technical problem is solved by the present invention, which provides for carrying out the stabilization process in such a manner that no cracks are formed in the stabilized cladding layer, so that the optical waveguide preform does not tear, rupture or break.

An object of the invention is to remove at least a part of the impurities and undesired elements contained in the porous cladding layer during the stabilization.

DETAILED DESCRIPTION OF THE PREFERRED EMBODIMENT

This technical problem is solved according to the present invention by slowly heating the powder layer to approximately 150° C., the temperature is then continuously raised at a higher rate to 1150° C.-1200° C., and the final temperature being maintained for a prolonged period.

If this procedure is followed during the stabilization of the cladding layer, then the adhesion forces between the particles in the porous cladding layer are greater than the adhesion force between the glass core rod and the cladding layer. The porous cladding layer can therefore slide on the core rod, while it is being almost isotropically densified both radially and axially. In accordance with the invention, in order to make certain that this layer does not deform during stabilization of the cladding layer which is an oxide powder, the densification is carried out in an atmosphere having an isothermal temperature distribution of a maximum temperature of approximately 1200° C. until the relative density of 25-50 percent is reached.

If the stabilization of the cladding layer is carried out in an atmosphere with isothermal temperature distribution, then the core and the cladding layer are essentially at the same temperature.

In the stabilization, which is carried out simultaneously with the pre-drying of the powder layer in a helium atmosphere at a maximum temperature of almost 1200° C., the porous cladding layer shrinks in an axial direction by sliding along the core rod. The core rod does not change its shape significantly during this process. The shrinkage of the porous cladding layer proceeds almost isotropically.

The process according to the invention is carried out, for example, in the following manner:

A glass tube with an internal diameter of fifteen centimeters (15 cm), length of one hundred ten centimeters (110 cm), and a glass core rod with a diameter of eight millimeter (8 mm) located coaxially in it is filled with $SiO_2$ powder up to a relative density of five percent (5%). The ratio of cladding diameter to core diameter of the finished optical waveguide preform is to have a value of 2.5 and the difference in the refractive indexes is to have a value of $5.0 \times 10^{-3}$.

In a furnace with an isothermal temperature field, the arrangement described above is heated in the manner according to the invention from 30° C. to a maximum of 1180° C. The heating is carried out continuously, with the heating rate having a value of 0.5° C./minute during the first section of the process up to approximately 150° C., and then being increased to 2° C./minute starting at 150° C. The peak temperature of 1180° C. is maintained for three hours.

The product produced in this stabilization process is a crack-free, geometrically uniform optical waveguide preform with a fifty percent (50%) relative density of the cladding layer, a diameter of the cladding layer of sixty-six centimeters (66 cm), and a length of fifty centimeters (50 cm). The cladding layer shrinks almost isotropically during the stabilization period. In the radial direction, the shrinkage is slightly greater, i.e., by approximately five percent (5%).

The optical waveguide preform produced in this manner, possibly after the performance of additional treatment processes, for example, for the removal of impurities, can then be sintered in a sintering furnace with a gradient temperature field with a temperature gradient of 100° C./cm at 1530° C. This optical waveguide preform is sufficient to produce an optical waveguide with a length of one hundred kilometers (100 km).

The impurities contained in the porous cladding layer are physically or chemically bound water, chlorides, such as germanium chloride, and iron compounds. These substances, which interfere with the light guidance in the optical waveguide, must be removed either during the stabilization process or in a subsequent chlorination process. In the stabilization process, helium is advantageously used as a scavenging gas, with the helium passing around or through the powder layer. This gas is chemically inert, has a high thermal conductivity, and diffuses easily through glass. If a small quantity (maximum value of 10 volume percent) of oxygen is mixed with the helium, the removal of hydrocarbons is facilitated.

Thus, it can be seen from the foregoing specification that the process of the present invention provides an effective method for producing an optical waveguide perform.

The preferred embodiment admirably achieves the objects of the present invention; however, it should be appreciated that departures can be made by those skilled in the art without departing from the spirit and scope of the invention which is limited only by the following claims.

What is claimed is:

1. Process for the production of an optical waveguide preform having a cladding layer and a core, comprising the steps of:
    (a) providing a cylindrical glass core rod;
    (b) applying a tubular powder layer onto the cylindrical glass core rod;
    (c) heating the tubular powder layer at a first rate to 150° C.;
    (d) increasing the temperature of the tubular powder layer at a second rate higher than the first rate to a temperature between 1150° C. and 1200° C.;
    (e) maintaining the tubular powder layer at a temperature between 1150° C. and 1200° C. for a period of time to densify the tubular powder layer; and
    (f) sintering the tubular powder layer at a temperature above 1250° C. to densify the tubular powder layer to a final density to form the cladding layer.

2. Process according to claim 1, wherein, during the maintaining step, the powder layer is densified to a relative density of 25–50 percent of the final density.

3. Process according to claim 1, wherein a helium atmosphere is used.

4. Process according to claim 3, wherein a small proportion of oxygen, with a maximum value of 10 volume percent, is mixed with the helium.

5. Process for the production of an optical waveguide preform having a cladding layer, with a final density, and a core, comprising the steps of:
    (a) providing a core rod;
    (b) providing a powder layer on the core rod;
    (c) densifying the powder layer in an atmosphere with an isothermal temperature distribution of approximately 1200° C. until the powder layer has a relative density of at least 25 percent of the final density; and
    (d) sintering the powder layer at a temperature above 1250° C. to densify the powder layer to the final density to form the cladding layer.

6. Process according to claim 5, wherein, during the densifying step, the powder layer is densified to a relative densify of 25–50 percent of the final density.

7. Process according to claim 5, wherein a helium atmosphere is used during densification of the cladding layer.

8. Process according to claim 7, wherein a small proportion of oxygen, with a maximum value of 10 volume percent, is mixed with the helium.

* * * * *

UNITED STATES PATENT AND TRADEMARK OFFICE
CERTIFICATE OF CORRECTION

PATENT NO.  : 5,215,564
DATED       : June 1, 1993
INVENTOR(S) : Dieter Weber

It is certified that error appears in the above-identified patent and that said Letters Patent is hereby corrected as shown below:

Claim 6, col. 4, line 35, "densify"

should be --density--.

Signed and Sealed this

Eighth Day of March, 1994

Attest:

BRUCE LEHMAN

Attesting Officer

Commissioner of Patents and Trademarks